United States Patent
Döhler et al.

(10) Patent No.: US 12,065,579 B2
(45) Date of Patent: Aug. 20, 2024

(54) USE OF ORGANOSILOXANES COMPRISING AROMATIC GROUPS, IN RELEASE COATINGS

(71) Applicant: Evonik Operations GmbH, Essen (DE)

(72) Inventors: Hardi Döhler, Essen (DE); Irem Karabulut, Gelsenkirchen (DE)

(73) Assignee: Evonik Operations GmbH, Essen (DE)

( * ) Notice: Subject to any disclaimer, the term of this patent is extended or adjusted under 35 U.S.C. 154(b) by 583 days.

(21) Appl. No.: 17/414,785

(22) PCT Filed: Dec. 10, 2019

(86) PCT No.: PCT/EP2019/084374
§ 371 (c)(1),
(2) Date: Jun. 16, 2021

(87) PCT Pub. No.: WO2020/126655
PCT Pub. Date: Jun. 25, 2020

(65) Prior Publication Data
US 2022/0112398 A1   Apr. 14, 2022

(30) Foreign Application Priority Data

Dec. 19, 2018  (EP) ..................... 18213853

(51) Int. Cl.
C08F 2/46 (2006.01)
C08F 2/50 (2006.01)
C08G 61/04 (2006.01)
C09D 183/04 (2006.01)

(52) U.S. Cl.
CPC ................. C09D 183/04 (2013.01)

(58) Field of Classification Search
CPC ...... C09D 183/04; C08G 77/80; C08G 77/20; C08L 83/00
USPC ................... 522/99, 1, 113; 520/1
See application file for complete search history.

(56) References Cited

U.S. PATENT DOCUMENTS

| | | | |
|---|---|---|---|
| 4,587,136 A * | 5/1986 | White | C08L 83/08 428/419 |
| 4,978,726 A | 12/1990 | Döhler et al. | |
| 5,145,915 A | 9/1992 | Weitemeyer et al. | |
| 5,146,005 A | 9/1992 | Weitemeyer et al. | |
| 5,260,402 A | 11/1993 | Weitemeyer et al. | |
| 5,460,863 A | 10/1995 | Kessel et al. | |
| 5,696,211 A | 12/1997 | Chung et al. | |
| 5,866,630 A | 2/1999 | Mitra et al. | |
| 6,211,322 B1 | 4/2001 | Döhler et al. | |
| 6,268,404 B1 | 7/2001 | Döhler et al. | |
| 7,250,204 B2 | 7/2007 | Brand et al. | |
| 7,276,541 B2 | 10/2007 | Döhler et al. | |
| 7,727,599 B2 | 6/2010 | Doehler et al. | |
| 7,893,128 B2 | 2/2011 | Busch et al. | |
| 8,344,089 B2 | 1/2013 | Frey et al. | |
| 9,539,549 B2 | 1/2017 | Haensel et al. | |
| 10,407,592 B2 | 9/2019 | Amajjahe et al. | |
| 10,465,032 B2 | 11/2019 | Doehler et al. | |
| 11,001,737 B2 | 5/2021 | Pomorin et al. | |
| 2004/0054115 A1 | 3/2004 | Lautenschlager et al. | |
| 2004/0082681 A1 | 4/2004 | Brand et al. | |
| 2005/0054769 A1 | 3/2005 | Doehler et al. | |
| 2005/0136269 A1 | 6/2005 | Doehler et al. | |
| 2005/0209359 A1 | 9/2005 | Brand et al. | |
| 2007/0059539 A1 | 3/2007 | Doehler et al. | |
| 2007/0197678 A1 | 8/2007 | Cavaleiro et al. | |
| 2007/0203307 A1 | 8/2007 | Cavaleiro et al. | |
| 2007/0287765 A1 * | 12/2007 | Busch | C09D 183/14 522/148 |
| 2007/0295243 A1 | 12/2007 | Dohler et al. | |
| 2007/0299231 A1 | 12/2007 | Doehler et al. | |
| 2008/0064782 A1 | 3/2008 | Doehler et al. | |
| 2008/0187702 A1 | 8/2008 | Ferenz et al. | |
| 2010/0298485 A1 | 11/2010 | Frey et al. | |
| 2012/0279922 A1 | 11/2012 | Haensel et al. | |
| 2017/0369619 A1 | 12/2017 | Doehler et al. | |
| 2018/0057716 A1 | 3/2018 | Henna et al. | |
| 2018/0258228 A1 | 9/2018 | Amajjahe et al. | |
| 2019/0048228 A1 | 2/2019 | Amajjahe et al. | |
| 2019/0055420 A1 | 2/2019 | Beyer et al. | |

(Continued)

FOREIGN PATENT DOCUMENTS

| | | |
|---|---|---|
| CN | 107406730 | 11/2017 |
| CN | 108047468 | 5/2018 |
| CN | 108699421 | 10/2018 |

(Continued)

OTHER PUBLICATIONS

Butts et al., "*Silicones*", Encyclopedia of Polymer Science and Technology, 2003, vol. 11, pp. 765-841.
Changchun Applied Chem Inst Chinese ACAD, "*Preparation of shock-hardening material includes mixing main chain oligomer, chain extender and boron-containing compounds, reacting and mixing primary reaction system, branched oligomer, chemical crosslinking agent and catalyst*", WPI, XP-002792193, 2018, 2 pages.
International Search Report mailed Jan. 9, 2020 in PCT/EP2019/084374, with translation, 7 pages.
Written Opinion mailed Jan. 9, 2020 in PCT/EP2019/084374, with translation, 10 pages.

(Continued)

*Primary Examiner* — Jessica Whiteley
(74) *Attorney, Agent, or Firm* — Grüneberg and Myers PLLC

(57) ABSTRACT

An organosiloxane which has at least one aromatic radical can be used in release coatings. Compositions, radiation-curing coating materials and release coatings can contain this organosiloxane. A method can be used to produce a release coating using this organosiloxane. The said organosiloxane is notable in that the at least one aromatic radical is bonded via a non-aromatic organic radical to a silicon atom.

14 Claims, No Drawings

(56) References Cited

U.S. PATENT DOCUMENTS

2019/0161656 A1    5/2019    Pomorin et al.

FOREIGN PATENT DOCUMENTS

| DE | 10 2004 034 740 | | 2/2006 | |
|---|---|---|---|---|
| DE | 10 2005 001 040 | | 7/2006 | |
| EP | 1 276 825 | | 9/2004 | |
| JP | S64-29459 | | 1/1989 | |
| JP | H01-230669 | | 9/1989 | |
| JP | H03-17146 | | 1/1991 | |
| JP | H09-137128 | | 5/1997 | |
| JP | H10-292026 | | 11/1998 | |
| JP | 2015-120245 | | 7/2015 | |
| RU | 2164400 | C2 | 3/2001 | |
| WO | 2013/108102 | A2 | 7/2013 | |
| WO | 2013/108102 | A3 | 7/2013 | |
| WO | WO-2013108102 | A2 * | 7/2013 | ............... B65D 1/00 |

OTHER PUBLICATIONS

U.S. Appl. No. 11/851,521, filed Sep. 7, 2007, 2007/0295243, Dohler et al.
U.S. Pat. No. 8,344,089, Jan. 1, 2013, 2010/0298485, Frey et al.
U.S. Pat. No. 9,539,549, Jan. 10, 2017, 2012/0279922, Haensel et al.
U.S. Pat. No. 10,465,032, Nov. 5, 2019, 2017/0369619, Doehler et al.
U.S. Pat. No. 7,250,204, Jul. 31, 2007, 2004/0082681, Brand et al.
U.S. Pat. No. 7,276,541, Oct. 2, 2007, 2005/0054769, Döhler et al.
U.S. Appl. No. 11/013,639, filed Dec. 16, 2004, 2005/0136269, Doehler et al.
U.S. Appl. No. 11/780,799, filed Sep. 13, 2007, 2007/0299231, Doehler et al.
U.S. Appl. No. 11/530,562, filed Sep. 11, 2006, 2007/0059539, Doehler et al.
U.S. Appl. No. 11/677,244, filed Feb. 21, 2007, 2007/0197678, Cavaleiro et al.
U.S. Appl. No. 11/677,821, filed Feb. 22, 2007, 2007/0203307, Cavaleiro et al.
U.S. Pat. No. 7,893,128, Feb. 22, 2011, 2007/0287765, Busch et al.
U.S. Pat. No. 7,727,599, Jun. 1, 2010, 2008/0064782, Doehler et al.
U.S. Appl. No. 12/024,305, filed Feb. 1, 2008, 2008/0187702, Ferenz et al.
U.S. Pat. No. 11,001,737, May 11, 2021, 2019/0161656, Pomorin et al.
U.S. Pat. No. 10,407,592, Sep. 10, 2019, 2019/0048228, Amajjahe et al.
U.S. Appl. No. 15/760,855, filed Mar. 16, 2018, 2018/0258228, Amajjahe et al.
U.S. Pat. No. 5,145,915, Sep. 8, 1992, Weitemeyer et al.
U.S. Appl. No. 09/259,233, filed Mar. 1, 1999.
U.S. Pat. No. 5,146,005, Sep. 8, 1992, Weitemeyer et al.
U.S. Pat. No. 6,211,322, Apr. 3, 2001, Döhler et al.
U.S. Pat. No. 6,268,404, Jul. 31, 2001, Döhler et al.
U.S. Appl. No. 11/123,564, filed May 6, 2005, 2005/0209359, Brand et al.
U.S. Pat. No. 5,260,402, Nov. 9, 1993, Weitemeyer et al.
U.S. Pat. No. 4,978,726, Dec. 18, 1990, Döhler et al.
Chinese Office Action dated Apr. 2, 2022, in Chinese Application No. 201980084238.8, 8 pages.
Russian Office Action and Search Report dated Mar. 31, 2022, in Russian Application No. 2021118578, 8 pages.
European Office Action dated Jul. 7, 2023, in European Patent Application No. 19813592.3, 4 pages.
Steudle et al., U.S. Appl. No. 18/041,426, filed Feb. 13, 2023.
U.S. Appl. No. 18/041,426, filed Feb. 13, 2023, Steudle et al.

* cited by examiner

USE OF ORGANOSILOXANES COMPRISING AROMATIC GROUPS, IN RELEASE COATINGS

CROSS-REFERENCE TO RELATED APPLICATIONS

This application is the National Stage entry under § 371 of International Application No. PCT/EP2019/084374, filed on Dec. 10, 2019, and which claims the benefit of European Application No. 18213853.7, filed on Dec. 19, 2018. The content of each of these applications is hereby incorporated by reference in its entirety.

BACKGROUND OF THE INVENTION

Field of the Invention

The present invention relates to the use of an organosiloxane which has at least one aromatic radical in release coatings; to compositions, radiation-curing coating materials and release coatings which comprise this organosiloxane; and to a method for producing a release coating using this organosiloxane. The said organosiloxane is notable in that the at least one aromatic radical is bonded via a non-aromatic organic radical to a silicon atom.

Description of Related Art

Release coatings (often also referred to as adhesive coatings) are known from the prior art. They are used, for example, in adhesive tapes or label laminates. In general here a sheetlike carrier, such as a polymeric film, paper or card, for example, is provided with a release coating. In comparison to the uncoated carrier, the carrier provided with a release coating exhibits reduced adhesion towards adhering materials. In daily use, the release coatings, and the carriers furnished with them, are frequently employed for protecting sticky surfaces from fouling or unintended sticking, as in the case of adhesive labels, on adhesive tapes, in the hygiene sector, in the context of medical plasters and patches, self-adhesive decorative and protective films, or baking paper. Release coatings are used in particular with sheetlike materials, such as papers or films, to reduce the tendency of adhering products to adhere to these surfaces.

Release coatings comprising silicone materials have proven to be particularly advantageous. The release coatings in this case are produced from one or more organosiloxanes by crosslinking. This crosslinking frequently takes a thermal course, by way of a hydrosilylation reaction between a hydrosilyl-functional compound and an ethylenically unsaturated compound, in the presence of a catalyst, at relatively high temperatures of in general above 100° C. Alternatively, release coatings are produced by crosslinking silicones with ethylenically unsaturated, radically polymerizable groups, by irradiation with high-energy radiation, or thermally, in the presence of suitable initiators or radical-initiators. Crosslinking by irradiation is employed especially where the carrier material is heat-sensitive and for that reason a thermal curing is not appropriate. This is the case in particular when the sheetlike carriers are polymeric films of polyethylene or polypropylene, since the softening temperature or the carrier material is comparatively low.

Silicones which have ethylenically unsaturated, radically polymerizable groups are, for example, (meth)acrylate-modified organosiloxanes. (Meth)acrylate-modified organosiloxanes are described in numerous patent specifications, as for example in U.S. Pat. Nos. 6,211,322 and 4,978,726. These organosiloxanes can be crosslinked three-dimensionally by free radicals and cure thermally with addition of peroxides, for example, or under the effect of high-energy radiation, such as UV radiation or electron beams, within a very short time to form coats which possess mechanical and chemical resistance. If UV light is used as radiation source, the crosslinking is accomplished preferably in the presence of photoinitiators and/or photosensitizers, such as, for example, benzophenone, benzoin, α-hydroxyalkylphenone, acylphosphine oxide or derivatives thereof. Customary photoinitiators are described for example in "A Compilation of Photoinitiators Commercially available for UV today" (K. Dietliker, SITA Technology Ltd., London 2002).

Adhesive coatings on sheetlike carriers in many cases require particularly low release forces, in other words a particularly easy detachment from adhesive materials. This property is Important, for example, for detachment of the matrix after label die-cutting, and in automatic label dispensing units. This property is also important if the adhesive material exhibits strong adhesion but low cohesion, as in the case of bitumen or sealants, for example. These are used, for example, in roof sealing and for sealing in electronic devices.

(Meth)acrylate-modified organosiloxanes can be varied in their modification density over wide ranges, irrespective of the molecular weight. As observed in WO2016096595, adhesive coatings comprising (meth)acrylate-modified organosiloxanes have low release forces especially when the siloxane chain possesses a high silicone character which is not disrupted by organic modifications of the siloxane chain.

EP1276825 proposes (meth)acrylate-modified organosiloxanes with an extremely long silicone chain and a very small proportion of reactive (meth)acrylate groups. (Meth)acrylate-modified organosiloxanes of this kind are difficult to obtain and difficult to reproduce in synthesis. The proportion of crosslinkable (meth)acrylate groups is so low that there is no assurance of effective curing. Incurable constituents remain in the release coating. In many application scenarios, nevertheless, the release forces of these siloxanes are not low enough.

JP03052498 describes the use of phenyl-methyl-siloxanes in thermally crosslinking siloxanes for improving the release characteristics with respect to adhering materials. Thermally crosslinking siloxanes of this kind have been known on the market since the 1970s. Thermally induced reactions are typically catalysed addition reactions of SiH groups onto vinylic or terminal double bonds. The effect of the phenyl-methyl-siloxanes described in JP03052498 in silicones which contain ethylenically unsaturated, radically polymerizable groups, such as (meth)acrylate acid ester groups, for example, and which are crosslinked under high-energy radiation, is not, however, the desired improvement in the release force.

Phenyl-methyl-siloxanes, in other words organosiloxanes in which methyl groups and phenyl groups are bonded directly on silicon atoms, are particularly stable with respect to thermal exposure. The risk exists, however, that in the event of a high or long exposure to heat, particularly in the case of combustion, benzene is released. Films or papers with a silicone release coating generally have to be disposed of as waste after use; renewed use or recycling is normally not indicated. Silicone-coated papers in particular are not suitable for production of recycled paper, since the silicone coat is disruptive to the printability of the paper. Siliconized papers, and also siliconized films, are therefore often incinerated for recovery of energy, and this may lead to the release of benzene.

In addition there are also silicone compounds known in which aromatic radicals are attached on the silicon atom not directly but instead via an aliphatic bridge. For example, EP1640418 discloses the use of such silicone compounds as additives for improving the surface finishing, scratch resistance and abrasion resistance in thermoplastic elastomers. The use in release coatings, and the advantageous properties resulting from such use, in contrast, are not described in the prior art.

SUMMARY OF THE INVENTION

The problem addressed by the present invention was that of overcoming at least one disadvantage of the prior art.

A particular problem was to provide improved release coatings. Release coatings provided ought preferably to be able to be produced inter alia from organosiloxanes which contain ethylenically unsaturated, radically polymerizable groups, such as (meth)acrylate acid ester groups, for example, by crosslinking with high-energy radiation. These release coatings ought to enable preferably low release forces, in other worlds outstanding release characteristics with respect to adhering materials, and ought on thermal loading or in degradation processes to exhibit very little elimination and release of benzene, and also ought to manage without complicated syntheses which are difficult to access.

Surprisingly it has now been found that the use of an organosiloxane (I) which has at least one aromatic radical $R^{(aryl)}$ which is bonded via a non-aromatic organic radical Z to a silicon atom in release coatings solves this problem.

The problem addressed by the present invention is therefore solved by the subject-matter of the description. Advantageous configurations of the invention are specified in the examples and the description.

DETAILED DESCRIPTION OF THE INVENTION

The subject-matter of the invention is described by way of example below but without any intention that the invention be restricted to these illustrative embodiments. Where ranges, general formulae or classes of compounds are specified hereinbelow, these are intended to encompass not only the corresponding ranges or groups of compounds which are explicitly mentioned but also all subranges and subgroups of compounds which can be obtained by removing individual values (ranges) or compounds. Where documents are cited for the purposes of the present description, the entire content of these is intended to be part of the disclosure of the present invention.

Where average values are reported hereinafter, the values in question are numerical averages unless stated otherwise. Where measurement values, parameters or physical properties determined by measures are reported hereinafter, these are measurement values, parameters or physical properties, unless otherwise stated, which are measured at 25° C. and also preferably at a pressure of 101 325 Pa (standard pressure) and more preferably additionally at a relative atmospheric humidity of 50%.

Where numerical ranges in the form "from X to Y" are reported hereinafter, where X and Y represent the limits of the numerical range, this is synonymous with the statement "from at least X up to and including Y", unless otherwise stated. Statements of ranges thus include the range limits X and Y, unless stated otherwise.

The expression "(meth)acryl . . . " stands for "methacryl . . . " and/or "acryl . . . ".

Wherever molecules/molecule fragments have one or more stereocentres or can be differentiated into isomers on account of symmetries or can be differentiated into isomers on account of other effects. e.g. restricted rotation, all possible isomers are embraced by the present invention.

The various fragments in the formulae (Ia), (Ib) and (II) and (III) below may be distributed statistically. Statistical distributions are of blockwise construction with any desired number of blocks and with any desired sequence or are subject to a randomized distribution; they may also have an alternating construction or else form a gradient over the chain, where such is present; more particularly they can also form any mixed forms in which groups with different distributions may optionally follow one another.

The formulae (Ia), (Ib), (II) and (III) below describe compounds that are constructed from repeat units, for example repeating fragments, blocks or monomer units, and may have a molar mass distribution. The frequency of the repeat units is reported by indices. The indices used in the formulae should be regarded in particular as statistical averages (number averages). The indices used and also the value ranges of the specified indices are thus understood to be averages of the possible statistical distribution of the structures and/or mixtures thereof that are actually present.

Specific embodiments may lead to restrictions to the statistical distributions as a result of the embodiment. There is no change in the statistical distribution for all regions unaffected by the restriction.

A first subject of the present invention is therefore the use of at least one organosiloxane (I) which has at least one aromatic radical $R^{(aryl)}$ which is bonded via a non-aromatic organic radical Z to a silicon atom in release coatings.

The use according to the invention leads to an improvement in the release effect and/or to a reduction in the release of benzene. The organosiloxane (I) is therefore used in release coatings as an agent for improving the release effect and/or for reducing the release of benzene.

Without being tied by any one theory, it is assumed that a direct linking of an aromatic group, such as a phenyl group, to a silicon atom promotes the release of aromatics, such as benzene, whereas an indirect linking of this aromatic group to a silicon atom, via a non-aromatic organic radical, hinders release of the corresponding aromatic.

An organosiloxane is understood to be a compound which has organic radicals bonded to silicon atoms and which also has structural units of the formula ≡Si—O—Si≡, where "E" stands for the three remaining valencies of the silicon atom in question. The organosiloxanes are preferably compounds composed of units selected from the group consisting of $M=[R_3SiO_{1/2}]$, $D=[R_2SiO_{2/2}]$, $T=[R_3SiO_{2/2}]$ and which optionally also have units of the formula $Q=[R_4SiO_{3/2}]$, where R is a monovalent organic radical. The radicals R may each be selected independently of one another and in a pairwise comparison are identical or different.

In accordance with the invention the organosiloxane (I) has a non-aromatic organic radical Z which is bonded directly to a silicon atom, and also has at least one aromatic radical $R^{(aryl)}$ which in turn is bonded directly to this non-aromatic organic radical Z.

This non-aromatic, organic radical Z is therefore a z-valent radical to which (z−1) radicals $R^{(aryl)}$ are bonded, but at least one radical $R^{(aryl)}$ is bonded. It is therefore the case that z≥2. Preferably z is 2 to 4, more preferably 2 to 3, very preferably 2. The non-aromatic organic radical Z and the at least one aromatic radical $R^{(aryl)}$ therefore together form a monovalent organic radical of the formula $Z(R^{(aryl)})_{(z-1)}$, which hereinafter is also called $(R^{(aryl)})_{(z-1)}Z$, —Z—$(R^{(aryl)})_{(z-1)}$ or $(R^{(aryl)})_{(z-1)}$—Z—. The radical $Z(R^{(aryl)})_{(z-1)}$ is bonded directly to a silicon atom. There are therefore structural units of the form ≡Si—$Z(R^{(aryl)})_{(z-1)}$ present, where "≡" stands for the remaining three valencies of the silicon atom. Here, one silicon atom may carry 1, 2 or 3 radicals $Z(R^{(aryl)})_{(z-1)}$ preferably 1 or 2, more preferably 1.

The nonaromatic organic radical Z in each case independently of any other is preferably selected from the group consisting of divalent non-aromatic organic radicals consisting of carbon, hydrogen and optionally oxygen. The non-aromatic organic radical Z here more preferably has 2 to 130, more preferably still 2 to 10, very preferably 2 to 3 carbon atoms.

For example, the radicals Z each independently of one another may be selected from the group consisting of divalent aliphatic hydrocarbon radicals and divalent non-aromatic polyether radicals.

The aromatic radical $R^{(aryl)}$ preferably has at least 6 to 50, more preferably 6 to 12, more preferably still 6 to 7, very preferably 6 carbon atoms. With particular preference the radical $R^{(aryl)}$ is a phenyl radical.

It is further preferred for the organosiloxane (I), besides the non-aromatic organic radicals Z and the aromatic radicals $R^{(aryl)}$, hence in other words besides the monovalent organic radicals of the formula $Z(R^{(aryl)})_{(z-1)}$, additionally to have further organic radicals, which each independently of one another are selected from the group consisting of aliphatic hydrocarbons, preferably aliphatic hydrocarbon radicals having 1 to 20 carbon atoms, more preferably aliphatic hydrocarbon radicals having 1 to 10 carbon atoms, more preferably methyl radicals (also referred to as "CH₃" or "—CH₃").

It is further preferred for up to 98%, preferably 50% to 97%, more preferably 60% to 95% of the organic radicals in the organosiloxane (I) that are bonded in the silicon atoms to be selected each independently of one another from aliphatic hydrocarbon radicals, preferably having 1 to 20 carbon atoms, more preferably having 1 to 10 carbon atoms, very preferably CH₃.

The statement that a particular percentage of the silicon atoms of an organosiloxane is substituted in a particular way pertains to the molar fraction of all silicon atoms in the numerical statistical average of all molecules in the component in question, unless otherwise indicated.

In one preferred embodiment the organosiloxane (I) is characterized in that:
Z in each case independently of any other is selected from the group consisting of divalent aliphatic hydrocarbon radicals having 2 to 20, preferably 2 to 3, more preferably 2 carbon atoms;
$R^{(aryl)}$ in each case independently of any other is selected from the group consisting of radicals according to the general formula

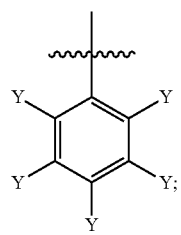

where:
Y in each case independently of any other is selected from the group consisting of H and monovalent aliphatic hydrocarbon radicals having 1 to 20 carbon atoms, preferably H and/or CH₃, more preferably H.
Preferably:
Z in each case independently of any other is selected from the group consisting of divalent radicals —$(C_nH_{2n})$— where n=2 to 20, preferably 2 to 3, more preferably 2; and
Y in each case independently of any other is selected from the group consisting of monovalent radicals —$(C_{n'}H_{2n'+1})$ where n'=0 to 20, preferably 0 and 1, more preferably 0.

With particular preference the organosiloxane (I) has at least one phenyl radical which is bonded via a —CH₂—CH₂— radical to a silicon atom. This means that with particular preference there is at least one phenylethyl radical bonded to a silicon atom.

It is preferred for the radicals $R^{(aryl)}$ to be bonded by the radicals Z to at least 2%, preferably 3% to 50%, more preferably 5% to 40% of the silicon atoms of the organosiloxane (I). Preferably, of the organic radicals bonded to the silicon atoms of the organosiloxane (I), at least 2%, preferably 3% to 50%, more preferably 5% to 40% comprise a radical $R^{(aryl)}$. It is therefore preferred for at least 2%, preferably 3% to 50%, more preferably 5% to 40% of the silicon atoms of the organosiloxane (I) to have a radical $R^{(aryl)}_{(z-1)}Z$.

It is possible for radicals $R^{(aryl)}$ to be bonded via radicals Z to terminal silicon atoms of the organosiloxane (I), in other words, for example, in α,ω position. It is preferred, however, for radicals $R^{(aryl)}$ to be bonded via radicals Z not to terminal silicon atoms or the organosiloxane (I), but rather to non-terminal silicon atoms of the organosiloxane (I). It is therefore preferred for radicals $(R^{(aryl)})_{(z-1)}Z$ to be present not bonded to terminal silicon atoms, but instead bonded to non-terminal silicon atoms of the organosiloxane (I). It is further preferred for the radicals $R^{(aryl)}$ to be bonded via the radicals Z exclusively to non-terminal silicon atoms of the organosiloxane (I). It is further preferred, therefore, for the radicals $(R^{(aryl)})_{(z-1)}Z$ to be bonded exclusively to non-terminal silicon atoms of the organosiloxane (I). As also already described above, z is preferably 2 to 4, more preferably 2 to 3, very preferably 2.

It is further preferred for the organosiloxane (I) to have 10 to 500, preferably 15 to 300, more preferably 20 to 200, very preferably 30 to 180 silicon atoms.

In one preferred embodiment the at least one organosiloxane (I) is a compound of the general formula (Ia):

with
$\underline{M}=[R'_3SiO_{1/2}]$;
$\underline{D}=[R'_2SiO_{2/2}]$;
$\underline{T}=[R'_3SiO_{2/2}]$;
$\underline{Q}=[R'_4SiO_{3/2}]$:
in which
R' in each case independently of any other is selected from the group consisting of R" and R'''; in which:
R" in each case independently of any other is selected from monovalent organic non-aromatic radicals, preferably aliphatic hydrocarbon radicals having 1 to 20 carbon atoms, more preferably methyl groups;
R''' in each case independently of any other is selected from monovalent radicals of the formula $(R^{(aryl)})_{(z-1)}Z$, as defined above;

where:
m=2 to (2+t+2*q);
d=0 to 800, preferably 10 to 350, particularly preferably 15 to 200;
t=0 to 50, preferably 0 to 5, particularly preferably 0;
q=0 to 50, preferably 0 to 5, particularly preferably 0;
with the proviso that the organosiloxane (I) has at least one, preferably 2 to 200, more preferably 3 to 150 radicals R'''.

It is preferred for at least 2%, more preferably 3% to 50%, very preferably 5% to 40% of the radicals R' to be selected from the group consisting of radicals R'''.

With further preference the at least one organosiloxane (I) is a compound of the general formula (Ib):

$$M^1{}_{m1}M^2{}_{m2}D^1{}_{d1}D^2{}_{d2}T^1{}_{t1} \qquad (Ib);$$

with
$M^1=[R^1{}_3SiO_{1/2}]$;
$M^2=[R^1{}_2R^2SiO_{1/2}]$;
$D^1=[R^1R^2SiO_{2/2}]$;
$D^2=[R^1R^2SiO_{2/2}]$;
$T^1=[R^1SiO_{3/2}]$;
in which
$R^1$ in each case independently of any other is selected from the group consisting of monovalent aliphatic hydrocarbon radicals having 1 to 20 carbon atoms, preferably 1 to 10 carbon atoms, more preferably methyl groups;
$R^2$ in each case independently of any other is selected from the group consisting of radicals of the formula —$[(OAlk)_a]_b$—$(O)_{k1}$—$R^{(i)}$;
$R^{(i)}$ in each case independently of any other is selected from the group consisting of H, monovalent aliphatic hydrocarbon radicals having 1 to 20 carbon atoms, and radicals of the formula —$(CH_2$—$CH^{(ii)})_c$—$(O)_{k2}$-Ph$(R^{(iii)})_f$;
$R^{(ii)}$ in each case independently of any other is selected from the group consisting of H and/or $CH_3$;
$R^{(iii)}$ in each case independently of any other is selected from the group consisting of $C_{1-20}$ alkyl radicals, preferably $CH_3$;
Alk in each case independently of any other is selected from the group consisting of $C_{1-4}$ alkylene radicals;
Ph is a phenyl radical;
where:
m1=0 to (2+t1);
m2=0 to (2+t1);
d1=0 to 500, preferably 10 to 300, particularly preferably 15 to 200;
d2=0 to 100, preferably 0 to 50, particularly preferably 0;
t1=0 to 50, preferably 0 to 5, particularly preferably 0;
a=0 to 30;
b=0 or 1;
c=0 or 1, and if c=0: (k1+k2)=0 or 1;
f=0 to 5, preferably 0 to 1, particularly preferably 0;
k1=0 or 1;
k2=0 or 1;
n=0 or 1;
with the proviso that organosiloxane (I) has at least one, preferably 2 to 200, more preferably 3 to 150 radicals of the formula —$(CH_2$—$CHR^{(ii)})_c$—$(O)_{k2}$-Ph$(R^{(iii)})_f$.

The units —$(CH_2$—$CHR^{(ii)})$— may be bonded in different ways to the adjacent groups or atoms. In formula (Ib), —$(CH_2$—$CHR^{(ii)})$— in each case independently of any other is a group of the form —$(CH_2$—$CHR^{(ii)})$— and/or of the form —$(CHR^{(ii)}$—$CH_2)$—, but preferably is a group of the form —$(CH_2$—$CHR^{(ii)})$—.

It is preferred for a radical $R^{(i)}$ of the general formula —$(CH_2$—$CHR^{(ii)})_h$—$(O)_m$-Ph$(R^{(iii)})_f$ to be bonded to at least 2%, preferably 3% to 50%, more preferably 5% to 40% of the silicon atoms of the organosiloxane (I).

It is further preferred for the at least one aromatic radical $R^{(aryl)}$ and the non-aromatic organic radical Z of the organosiloxane (I) together to form a monovalent radical —$(CH_2$—$CHR^{(ii)})$-Ph$(CH_3)_f$, where $R^{(ii)}$ in each case independently of any other is selected from H and/or $CH_3$, and where f=0 or 1. It is therefore preferred for the radicals $Z(R^{(aryl)}{}_{(z-1)}$ and/or the radicals R''' in formula (Ia) and/or the radicals $R^2$ in formula (Ib) to be monovalent radicals of the formula —$(CH_2$—$CHR^{(ii)})$-Ph$(CH_3)_f$, where Ph is a phenyl radical and where $R^{(ii)}$ independently and each occurrence is selected from H and/or $CH_3$, preferably H, and where f=0 or 1, preferably 0.

It is therefore preferred for the at least one aromatic radical $R^{(aryl)}$ and the non-aromatic organic radical Z of the organosiloxane (I) together to form a monovalent radical in each case independently of any other selected from the group consisting of —$(CH_2$—$CH(CH_3))$-Ph$(CH_3)$, —$(CH_2$—$CH(CH_3))$-Ph, —$(CH_2$—$CH_2)$-Ph$(CH_3)$, —$(CH_2$—$CH_2)$-Ph, especially preferably, —$(CH_2$—$CH_2)$-Ph. It is therefore particularly preferred for the radicals $Z(R^{(aryl)}{}_{(z-1)}$ and/or the radicals R''' in formula (Ia) and/or the radicals $R^2$ in formula (Ib) to be monovalent radicals in each case independently of one another selected from the group consisting of —$(CH_2$—$CH(CH_3))$-Ph$(CH_3)$, —$(CH_2$—$CH(CH_3))$-Ph, —$(CH_2$—$CH_2)$-Ph$(CH_3)$, —$(CH_2$—$CH_2)$-Ph. especially preferably —$(CH_2$—$CH_2)$-Ph. It is therefore particularly preferred if the following is true for the organosiloxane (I): —Z—$(R^{(aryl)})_{(z-1)}$=R'''=$R^2$=—$(CH_2$—$CH_2)$-Ph.

It is additionally preferred for the organic radicals of the organosiloxane (I) which are different from $Z(R^{(aryl)}{}_{(z-1)}$ in each case independently of one another are selected from the group consisting of monovalent aliphatic hydrocarbon radicals, preferably those having hydrocarbon radicals with 1 to 20 carbon atoms, more preferably those with 1 to 10 carbon atoms, more preferably $CH_3$. It is therefore particularly preferred if: R''=R'=$CH_3$.

It is preferred that, of those organic radicals which are bonded to the silicon atoms of the organosiloxane (I) but do not comprise radicals $R^{(aryl)}$, at least 90%, preferably at least 95%, more preferably at least 99% are methyl radicals.

It is additionally preferred for organic radicals on the silicon atoms of the organosiloxane (I) to be at least 80%, preferably at least 90%, more preferably at least 99% methyl radicals and monovalent radicals of the formula —$(CH_2$—$CH_2)$-Ph. It is especially preferred for the only organic radicals bonded on the silicon atoms of the organosiloxane (I) to be methyl radicals and monovalent radicals of the formula —$(CH_2$—$CH_2)$-Ph.

It is additionally preferred for the molar ratio of methyl radicals to radicals of formula —$(CH_2$—$CH_2)$-Ph to be 20:1 to 1.5:1.

Preferably the organosiloxane (I) is linear. In this preferred embodiment, the organosiloxane (I) is composed of D units and two M units.

The organosiloxanes (I) are prepared preferably from a hydrosilylation in the manner known to those skilled in the art, and as described in EP 1640418 A1, for example. This involves using known methods to react the corresponding hydrosilyl-functional organosiloxanes with olefinically unsaturated compounds. Said olefinically unsaturated compounds are preferably selected from the group consisting of styrene, 2-methylstyrene, 3-methylstyrene, 4 methylstyrene and α-methylstyrene, preferably styrene. The hydrosilylation reaction here is preferably catalysed with the aid of the platinum group catalysts familiar to those skilled in the art, more preferably with the aid of Karstedt catalysts.

The organosiloxane (I) improves the properties of release coatings. These release coatings are preferably produced from compositions comprising at least one further organosiloxane (II). This further organosiloxane (II) has at least one ethylenically unsaturated, radically polymerizable group, allowing the composition to be cured by radiation, especially UV radiation or thermally, where appropriate with assistance from thermally activatable or radiation-activatable initiators.

A further subject of the invention is therefore a composition comprising the components (I) and (II), where component (I) is at least one organosiloxane (I), and component (II) is at least one organosiloxane (I) which is different from organosiloxane (I) and which has at least one ethylenically unsaturated, radially polymerizable group. Component (II) therefore consists of one or more organosiloxanes (II) which are different from the organosiloxanes (I).

It is advantageous for the organosiloxane (II) to have 50 to 500, preferably 55 to 300, more preferably 60 to 200, very preferably 60 to 180 silicon atoms.

It is further advantageous for 0.4% to 10%, preferably 0.6% to 8%, more preferably 0.8% to 7% of the silicon atoms of the organosiloxanes (II) to carry ethylenically unsaturated, radically polymerizable groups where one silicon atom may carry one, two or three such groups.

It is further advantageous, accordingly, for 0.4% to 10%, preferably 0.6% to 8%, more preferably 0.8% to 7% of the organic radicals bonded to the silicon atoms of the organosiloxane (II) to have ethylenically unsaturated, radically polymerizable groups.

The at least one organosiloxane (II) is preferably a compound of the general formula (II):

with
$M^3 = [R^3_3 SiO_{1/2}]$;
$M^4 = [R^3_2 R^4 SiO_{1/2}]$;
$D^3 = [R^3 R^4 SiO_{2/2}]$;
$D^4 = [R^3 R^4 SiO_{2/2}]$;
in which
  $R^3$ in each case independently of any other is selected from the group consisting of monovalent aliphatic hydrocarbon radicals having 1 to 20 carbon atoms, preferably 1 to 10 carbon atoms, more preferably methyl groups;
  $R^4$ in each case independently of any other is selected from the group consisting of monovalent non-aromatic organic radicals consisting of carbon, hydrogen and oxygen, preferably having 2 to 100 carbon atoms which have 1 to 5 ester groups, the ester groups being selected from the group consisting of ethylenically unsaturated, radically polymerizable ester groups and optionally non-radically polymerizable ester groups;
where:
  m3=0 to 2;
  m4=0 to 2, and m3+m4=2;
  d3=50 to 490, preferably 60 to 290, more preferably 70 to 190, very preferably 80 to 170;
  d4=0 to 15, preferably 0 to 10.
Preferably, furthermore, the proviso applies that
  the ratio of the sum (m4+d4) to the sum (d3+d4+2) is from 0.004 up to 0.1, preferably 0.006 to 0.8, and more preferably 0.008 to 0.7; and the sum (d3+d4+2) is 50 to 500, preferably 60 to 300, more preferably 70 to 200, very preferably 80 to 180.

The ethylenically unsaturated, radically polymerizable ester groups of the radicals $R^4$ in compounds of the formula (II) are preferably selected from acrylic ester groups and/or methacrylic ester groups, more preferably acrylic ester groups.

The non-radically polymerizable ester groups or the radicals $R^4$ in compounds or the formula (II) are preferably saturated monocarboxylic ester groups. The non-radically polymerizable ester groups are preferably selected from acetic, propionic, butyric, valeric and benzoic ester groups, more preferably acetic ester groups. More preferably, the saturated monocarboxylic ester groups are present in a numerical portion of 0% to 20%, preferably of greater than 0% to 15%, based on the number of all ester groups of the compounds of the formula (II). The radicals $R^4$ in compounds of the formula (I) preferably have no ester groups that are non-radically polymerizable.

Preferably the mass fraction of component (I) is preferably 0.1% to 20%, more preferably 0.2% to 15%, further preferably 0.5% to 10%, and the mass fraction of component (II) is 20% to 99.9%, more preferably 40% to 99.8%, further preferably 60% to 99.5%, based on the total mass of the composition.

Particularly preferred components (II) and/or organosiloxanes (II) are those as disclosed in WO2016096595, being referred to therein as component (II) and, respectively, compounds of the formula (I).

Component (II) and organosiloxanes (II) are available commercially, for example, under the name TEGO® RC 902 and TEGO® RC 702 from Evonik Nutrition & Care GmbH.

With preference the composition, as well as components (I) and (II), further comprises a component (III) additionally, with the component (III) being at least one organosiloxane (III) different from the organosiloxanes (I) and (II). Component (III) therefore consists of one or more organosiloxanes (III) which are different from the organosiloxanes (I) and (II).

It is advantageous for the organosiloxane (III) to have 4 to 40, preferably 10 to 30, silicon atoms.

It is further advantageous for 15% to 100%, preferably 20% to 50%, of the silicon atoms to carry ethylenically unsaturated, radically polymerizable groups, where one silicon atom may carry one, two or three such groups.

It is further advantageous accordingly for 15% to 100%, preferably 20% to 50%, of the organic radicals bonded to the silicon atoms of the organosiloxane (III) to have ethylenically unsaturated, radically polymerizable groups.

The at least one organosiloxane (III) is preferably a compound of the general formula (III):

with
$M^5 = [R^5_3 SiO_{1/2}]$;
$M^6 = [R^5_2 R^6 SiO_{1/2}]$;
$D^5 = [R^5_2 SiO_{2/2}]$;
$D^6 = [R^5 R^6 SiO_{2/2}]$;
in which
  $R^5$ in each case independently of any other is selected from the group consisting of monovalent aliphatic hydrocarbon radicals having 1 to 20 carbon atoms, preferably 1 to 10 carbon atoms, more preferably methyl groups;
  $R^6$ in each case independently of any other is selected from the group consisting of monovalent non-aromatic organic radicals consisting of carbon, hydrogen and oxygen, preferably having 2 to 100 carbon atoms which have 1 to 5 ester groups, the ester groups being selected from the group consisting of ethylenically unsaturated, radically polymerizable ester groups and optionally non-radically polymerizable ester groups;

where:

m5=0 to 2;
m6=0 to 2, preferably 0, and m5+m6=2;
d5=0 to 38, preferably 10 to 28;
d6=0 to 20, preferably 4 to 15;
Preferably, moreover, the proviso applies that
the ratio of the sum (m6+d6) to the sum (d5+d6+2) is from 0.15 up to 1, preferably from 0.2 to 0.5; and
the sum (d5+d6+2) is from 4 to 40, preferably from 10 to 30.

The ethylenically unsaturated, radically polymerizable ester groups of radicals $R^6$ in compounds of the formula (III) are preferably selected from acrylic ester groups and/or methacrylic ester groups, more preferably acrylic ester groups.

The non-radically polymerizable ester groups of the radicals $R^6$ in compounds of the formula (III) are preferably saturated monocarboxylic ester groups. The non-radically polymerizable ester groups are preferably selected from acetic, propionic, butyric, valeric and benzoic ester groups, more preferably acetic ester groups. More preferably, the saturated monocarboxylic ester groups are present in a numerical portion of 3% to 20%, preferably of 5% to 15%, based on the number of all ester groups of the compounds of the formula (III).

The mass fraction of component (III) is preferably 0% to 70%, more preferably 20% to 50%, further preferably 25% to 45%, based on the total mass of the composition.

Particularly preferred components (III) and/or organosiloxanes (III) are those as disclosed in WO2016096595, being referred to therein as component (III) and, respectively, compounds of the formula (II).

Component (III) and organosiloxanes (III) are available commercially under the name TEGO® RC 711 from Evonik Nutrition & Care GmbH.

Organosiloxanes having acrylic ester groups may be prepared, for example, by subjecting a hydrosilyl-functional organosiloxane to an addition reaction with an allyl glycidyl ether or another 30 suitable epoxide having an olefinically double bond, via a hydrosilylation reaction, and, after the addition reaction, esterifying the epoxide with acrylic acid, with opening of the epoxide ring. This procedure is described in DE-C-3820294 and EP0979851.

A further possibility for preparing acrylate-modified organosiloxanes is to subject a hydrosilyl-functional organosiloxane to an addition reaction with an alcohol having an olefinic double bond, allyl alcohol for example, in the presence of a platinum catalyst, and then reacting the hydroxyl group of this alcohol with acrylic acid or with a mixture of acrylic acid and optionally other unsaturated or saturated monocarboxylic acids. This procedure is described for example in DE-C-3810140 and EP0979851.

Where other ethylenically unsaturated acids or else saturated acids are used, It is possible analogously to obtain organosiloxanes having other ethylenically unsaturated, radically polymerizable ester groups or else having non-radically polymerizable ester groups.

Mixtures of two or more (meth)acrylated organosiloxanes with different chain lengths and/or types of modification are known from the prior art, as for example from: U.S. Pat. Nos. 6,548,588, 6,288,404, 6,548,568, the publication "TEGO® RC Silicones, Application Guide", and the product data sheets for the products TEGO® RC 902. RC 726, RC 711, RC 708, RC 709, RC 715, RC 706. A high molecular mass silicone acrylate with low-level modification is responsible primarily for the release properties, whereas highly modified silicone acrylates provide for effective adhesion to the substrate. Furthermore, one or more organic (meth)acrylated compounds may be added as adhesion components or as reactive diluents, for example, to one or to a mixture of two or more (meth)acrylated organosiloxane(s). The use of such combinations of (meth)acrylated compounds has the advantage over the individual components, for example, of improved substrate adhesion, targeted adjustment of adhesiveness, or the reduction in or increase in the viscosity.

It is therefore further preferred for the composition to comprise a component (IV), which is at least one compound (IV) different from the organosiloxanes (I), (II) and (III).

Therefore, in addition to components (I) and (II), the composition optionally further comprises the component (III) and/or component (IV).

The compound (IV) Is an organic compound which consists of the elements carbon, hydrogen and oxygen and which has 2 to 8 ethylenically unsaturated, radically polymerizable groups and also at least one oxyethylene group. The compound (IV) and the component (IV) are free, accordingly, of silicon atoms. Such compounds may be radiation-curing coating materials on a purely organic basis, as described in, for example, European Coatings Tech Files, Patrick Glöckner et al. "*Radiation Curing Coatings and printing inks*", 2008, *Vincentz Network*, Hanover, Germany.

Particularly preferred are radiation-curing coating materials on a purely organic basis, as described in WO2016096595. Particularly preferred, therefore, are those components (IV) and/or compounds (IV) as disclosed in WO2016096595, where they are identified as component (I). The component (IV) or the compound (IV) therefore preferably has 1 to 25, preferably 1 to 5, oxyethylene groups per ethylenically unsaturated, radically polymerizable group; more preferably 1 to 25, preferably 1 to 5, oxyethylene groups per acrylic ester group and/or methacrylic ester group. With further preference, component (IV) or compound (IV), as well as the at least one oxyethylene group, also has oxypropylene groups, in which case, more preferably, the number of oxypropylene groups is lower than the number of oxyethylene groups, more preferably only a maximum of 20% of the oxyalkyl groups are not oxyethylene groups, based on the total number of oxyalkyl groups in the component (IV) and/or the compound (IV).

Component (IV) and compounds (IV) are available commercially under the tradename Ebecryl TMPTA, Ebecryl OTA480, Ebecryl TPGDA, Ebecryl DPGDA, Ebecryl 892 and Ebecryl 11 from Allnex, Belgium.

The mass fraction of component (IV) Is preferably 0% to 40%, more preferably 2% to 20%, further preferably 3% to 15%, based on the total mass of the composition.

Components (II), (III) and (IV), or the organosiloxanes (II) and (III), and also the compound (IV), have ethylenically unsaturated, radically polymerizable groups. The ethylenically unsaturated, radically polymerizable groups are preferably ethylenically unsaturated, radically polymerizable ester groups. With further preference the ethylenically unsaturated, radically polymerizable groups are selected each independently from the group consisting of methacrylic ester groups and acrylic ester groups, more preferably acrylic ester groups. For example, the organosiloxane (II) and/or the organosiloxane (III) may have radicals of the formula 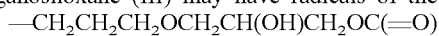

CH=CH$_2$ and/or radicals of the formula —CH$_2$CH$_2$CH$_2$OCH$_2$CH(OH)CH$_2$OC(=O)C(CH$_3$)=CH$_2$. Particularly preferred radicals with ethylenically unsaturated, radically polymerizable groups are radicals of the formula —CH$_2$CH$_2$CH$_2$OCH$_2$CH(OH)CH$_2$OC(=O)CH=CH$_2$.

The organosiloxane (II) and/or the organosiloxane (III) may also have ester groups which are not radically polymerizable. For example, the organosiloxane (II) and/or the organosiloxane (III) may have radicals of the formula —CH$_2$CH$_2$CH$_2$OCH$_2$CH(OH)CH$_2$OC(=O)CH$_2$—CHS.

One particularly preferred embodiment of the composition of the invention is characterized in that component (II) or the organosiloxane (II) has no ester groups which are not radically polymerizable, whereas component (III) or the organosiloxane (III) has ester groups which are not radically polymerizable. It is especially preferred for component (II) or the organosiloxane (II) to have, as radicals with ester groups, only radicals of the formula —CH$_2$CH$_2$CH$_2$OCH$_2$CH(OH)CH$_2$OC(=O)CH=CH$_2$, and for component (III) or the organosiloxane (III) to have, as radicals with ester groups, not only radicals of the formula —CH$_2$CH$_2$CH$_2$OCH$_2$CH(OH)CH$_2$OC(=O)CH=CH$_2$ but also radicals of the formula —CH$_2$CH$_2$CH$_2$OCH$_2$CH(OH)CH$_2$OC(=O)CH$_2$—CH$_3$.

The component (II) or the organosiloxane (II) preferably has no ester groups which are not radically polymerizable.

It Is further preferred for component (III) or the organosiloxane (III) to have not only the ethylenically unsaturated, radically polymerizable groups but also ester groups which are not radically polymerizable.

Particular preference is given to a composition comprising 0.1% to 20% of component (I),
20% to 99.9% of component (II),
0% to 45% of component (III),
0% to 15% of component (IV),
reported as mass fraction based on the total mass of the composition.

One preferred composition comprises not only the components (I) and (II) and the optional components (III) and (IV) but also one or more additional components which differ from the components (I), (ii), (III) and (IV).

It is further preferred for the compositions of the invention to be used as radiation-curing coating materials. Preferably, therefore, the compositions of the invention are radiation-curing coating materials.

The radiation-curing coating materials of the invention may be crosslinked three-dimensionally by free radicals, and cure thermally with addition of, for example, peroxides, or under the influence of high-energy radiation, such as UV or electron beams, within a very short time, to form mechanically and chemically resistant layers which, given a suitable composition of the coating materials of the invention, have predeterminable adhesive properties and also adhesion properties.

Where the radiation used is UV radiation, the crosslinking/curing takes place preferably in the presence of photoinitiators and/or photosensitizers. Preferred are photoinitiators of the Norrish 1 type, such as, for example benzophenone, benzoin, α-hydroxyalkylphenone, acylphosphine oxide or derivatives thereof. Customary photoinitiators are described for example in "A Compilation of Photoinitiators Commercially available for UV today" (K. Dietliker, SITA Technology Ltd., London 2002). Preferred radiation-curing coating materials of the invention comprise photoinitiators and/or photosensitizers in a mass fraction of 0.01% to 10%, more particularly of 0.1% to 5 wt %, based on the mass of the overall coating material. The photoinitiators and/or photosensitizers are preferably soluble in the compositions of the invention, more preferably soluble in a mass fraction of 0.01% to 10 wt %, more particularly of 0.1% to 5 wt %, based on the mass of the overall coating material.

One preferred composition, therefore, besides the components (I) and (II) and the optional components (III) and (IV), further comprises components different from these and selected from the group consisting of purely organic, phosphorus-containing or phosphorus-free compounds, having at least one ethylenically unsaturated, radically polymerizable group, which preferably polymerize under UV radiation, photoinitiators, photosensitizers, fillers, pigments, solvents, curing accelerators, anti-misting additives, amine synergists and stabilizers, such as, for example, phosphites or hindered amine light stabilizers (HALS), antioxidants and oxygen scavengers. Preferably the said purely organic, phosphorus-containing or phosphorus-free compounds which have at least one ethylenically unsaturated, radically polymerizable group polymerize under UV radiation.

It is preferred, furthermore, for the composition to be used in such a way that the cured coating material is a release coating.

This release coating comprises the organosiloxane (I). A further subject of the invention Is therefore a release coating which comprises an organosiloxane (I).

A further subject of the invention is a method for producing a release coating, comprising the directly or indirectly successive steps of:
 a. applying a composition of the invention to a surface;
 b. irradiating the composition with UV radiation.

It Is preferred here for the surface to be a surface of a carrier, preferably of a sheetlike carrier. The composition of the invention here may be applied one-sidedly or double-sidedly to the sheetlike carrier. The sheetlike carrier is preferably selected from the group consisting of paper, fabric, metal foils and polymeric films. The carrier may be smooth or else may have been provided with surface structures. Particularly preferred carriers are polypropylene films and polyethylene films.

Suitable UV radiation sources for curing the coating materials of the invention are medium-pressure mercury vapour lamps, optionally doped, or low-pressure mercury vapour lamps, UV-LED lamps, or so-called excimer emitters. The UV emitters may be polychromatic or monochromatic. The emission range of the emitter is preferably situated in the absorption range of the photoinitiators and/or photosensitizers.

Particularly preferred, furthermore, is the method product obtainable by the method of the invention.

A further subject of the invention is therefore a release coating obtainable by the method of the invention.

A further subject of the invention is therefore also a release coating obtainable by the use of the radiation-curing coating material of the invention, the cured coating material being a release coating.

A further subject of the invention is therefore also a release coating obtainable by curing of the composition of the invention, preferably by irradiation of the composition of the invention, more particularly by irradiation of the composition of the invention with UV radiation.

A further subject of the invention is therefore also a release coating obtainable by curing a composition comprising components (I) and (II), where component (I) is at least one organosiloxane (I), and component (II) is at least one organosiloxane (II) which is different from organosiloxane (I) and which has at least one ethylenically unsaturated, radically polymerizable group, preferably by irradiation, more particularly by irradiation with UV radiation.

Preference is given to a carrier furnished with a release coating, characterized in that the release coating comprises at least one organosiloxane (I) and/or is producible from a composition of the invention which comprises at least one organosiloxane (I), the carrier being preferably selected from the group consisting of paper, fabric, metal foils, polymeric films, more preferably polypropylene films and polyethylene films.

Particularly preferred, therefore, is the inventive use of the organosiloxane (I) in release coatings on carriers selected from the group consisting of paper, fabric, metal foils, polymeric films, more preferably polypropylene films and polyethylene films.

The release coatings find application, for example, in adhesive tapes, labels, packaging for self-adhesive hygiene products, food packaging, self-adhesive thermal papers, or liners for bitumen roofing membranes. The release coatings have a good release effect towards the adhesive materials employed in these applications.

The release effect with respect to adhesive materials, usually adhesive tapes or labels in industrial application, is expressed by the release force, with a low release force describing a good release effect. The release force is determined in accordance with *FINAT Handbook* 8th Edition, The Hague/NL, 2009 under the designation FTM 10, with the modification that the storage is carried out under pressure at 40° C. The release force depends on the quality of the release coating (e.g. uniformity, thickness and/or smoothness of the coating), on the adhesive material or adhesive, and on the test conditions. For the evaluation of release coatings, therefore, the adhesives or adhesive materials and test conditions present are to be the same. The release forces are ascertained using the adhesive tape TESA® 7475, trademark of Tesa SE, Germany, Hamburg, in 2.5 cm width.

The release coatings of the invention preferably have release forces of at most 20 cN/2.5 cm, more preferably of at most 10 cN/2.5 cm, very preferably of at most 8 cN/2.5 cm, and the release forces are at least 0.5 cN/2.5 cm, preferably at least 1 cN/2.5 cm.

The present invention is described by way of example in the examples set out below, without any possibility that the invention, the scope of application of which is apparent from the entirety of the description, can be read as being confined to the embodiments stated in the examples.

EXAMPLES

General Methods

The organosiloxanes are characterized with the aid of $^1$H NMR and $^{29}$Si NMR spectroscopy. These methods are familiar to those skilled in the art.

Non-Inventive Organosiloxanes Containing Phenyl Groups

Used as non-inventive organosiloxanes were commercially available phenyl-containing organosiloxanes from The DOW Chemical Company and Gelest Inc. (see Table 1a):

TABLE 1a

Structure of the commercially available non-inventive organosiloxanes containing phenyl groups

| Designation | Trade name | Raw material as per manufacturer details | Viscosity as per manufacturer details |
| --- | --- | --- | --- |
| NE-1 | DOW Dowsil 510 Fluid | Phenyl-methylpolysiloxane | 50 cSt |
| NE-2 | Gelest PMM-1021 | Polyphenyl-methyldimethylsiloxane | 500 cSt |
| NE-3 | Gelest PMM-1015 | Polyphenyl-methyldimethylsiloxane | 125 cSt |
| NE-4 | Gelest PMM-1025 | Polyphenyl-methyldimethylsiloxane | 50 cSt |

These products, according to the information from the technical datasheet, are organosiloxanes having phenyl groups bonded directly to the silicon. This was confirmed through $^{29}$Si NMR analysis, by the presence of signals around −35 ppm.

For direct comparability with the inventive organosiloxanes, additionally two non-inventive organosiloxanes were synthesized (see Table 1 b). The synthesis took place from cyclic phenyl-methyl-siloxanes according to Cheng Li et al. *"Ring-Opening Copolymerization of Mixed Cyclic Monomers: A Facile. Versatile and Structure-Controllable Approach to Preparing Poly(methylphenylsiloxane) with Enhanced Thermal Stability"*, Ind. Eng. Chain. Res. 2017, 56, 7120-7130.

TABLE 1b

Structure of the non-inventive organosiloxanes containing phenyl groups

| Designation | Si atoms without phenyl groups [a] | Si atoms with phenyl groups [a] | Total number of Si atoms [a] | Proportion of Si atoms with phenyl groups in % [b] |
| --- | --- | --- | --- | --- |
| NE-5 | 50 | 6 | 56 | 10.7 |
| NE-6 | 20 | 6 | 26 | 23.1 |

[a] average number per organosiloxane
[b] average molar fraction per organosiloxane Inventive Organosiloxanes (I)

The Inventive organosiloxanes (I) were prepared by equilibration in each case of a hydrogen-containing polydimethylsiloxane and subsequently hydrosilylation under platinum catalysis with styrene or alpha-methylstyrene, as described in EP 1640418 A1. In the $^{29}$Si NMR, there are no signals around −35 ppm (see Table 2).

TABLE 2

Structure of the inventive organosiloxanes

| Designation | Si atoms without phenyl groups [a] | Si atoms with phenyl groups [a] | Total number of Si atoms [a] | Proportion of Si atoms with phenyl groups in % [b] |
| --- | --- | --- | --- | --- |
| E-1 | 50 | 6 | 56 | 10.7 |
| E-2 | 20 | 6 | 26 | 23.1 |
| E-3 | 67 | 4 | 71 | 5.6 |

TABLE 2-continued

Structure of the inventive organosiloxanes

| Designation | Si atoms without phenyl groups [a] | Si atoms with phenyl groups [a] | Total number of Si atoms [a] | Proportion of Si atoms with phenyl groups in % [b] |
|---|---|---|---|---|
| E-4 | 108 | 42 | 150 | 28.0 |
| E-5 | 80  | 25 | 105 | 23.8 |
| E-6 | 45  | 10 | 55  | 18.1 |

[a] average number per organosiloxane
[b] average molar fraction per organosiloxane The Inventive compound E-1 corresponds in structure to the non-inventive compound NE-5. The inventive compound E-2 corresponds in structure to the non-inventive compound NE-6.

Radically Polymerizable Organosiloxanes (II) and (III)

The Inventive and the noninventive organosiloxanes containing phenyl groups were employed in the widely used TEGO® RC organosiloxanes of Evonik Nutrition & Care GmbH. Silicones modified with acrylate groups were selected. Two silicone mixtures were employed (Table 3):

TABLE 3

Radically polymerizable organosiloxanes

| Designation | Organosiloxane mixtures |
|---|---|
| M-1 | TEGO ® RC 902, TEGO ® RC 711 and TEGO ® Photoinitiator A18 in a weight ratio of 70:30:2 |
| M-2 | TEGO ® RC 702 is already preformulated with the Photoinitiator A18 |

TEGO® RC 902 and TEGO® RC 702 are an organosiloxane (II). According to $^{29}$Si NMR and $^1$H NMR analysis, these organosiloxanes are long-chain silicones with a slight modification by acrylate groups. TEGO® RC 711 is an organosiloxane (III). According to $^{29}$Si NMR and $^1$H NMR analysis, this organosiloxane is a short-chain silicone with a high acrylate group content. According to the information from the technical datasheet, this TEGO® RC 711 provides for effective anchoring of the coating material on the substrate.

Technical Examination of Benzene Elimination

The samples are pyrolysed by means of TGA (instrument: TA instruments, Discovery TGA). The test is performed on the pure organosiloxanes containing phenyl groups from Tables 1a, 1b and 2. To rule out contamination by other components of the mixture, the further components from Table 3 are not present. 0.5 mg of the sample is weighed out and is brought from 30° C. to 400° C. at a heating rate of 200° C./min. The temperature of 400° C. is maintained for 5 minutes. During the heating phase and residence time at 400° C. the emissions are captured on Tenax® TA. (polymeric adsorber resin based on poly(2,6-diphenyl-p-phenylene oxide), available commercially from Buchem BV) and analysed by means of a GC/MS thermodesorption system (Gerstel, Agilent). The result is reported as toluene equivalent in µg/g. The results of this investigation are stated in Table 4:

TABLE 4

Results of benzene elimination

| Designation | Benzene elimination µg/g |
|---|---|
| NE-1 | 961 |
| NE-2 | 535 |
| NE-3 | 602 |
| NE-4 | 202 |
| NE-5 | 857 |
| NE-6 | 593 |
| E-1  | 43  |
| E-2  | 46  |
| E-3  | 34  |
| E-4  | 42  |
| E-5  | 51  |
| E-6  | 12  |

From Table 4 it is apparent that standard commercial phenylsiloxanes with phenyl groups bonded directly on the silicon release significantly more benzene than is the case with the inventive silicones, in which the aromatic radical is bonded via a non-aromatic, organic radical Z to a silicon atom. The difference in benzene release is lower by a factor of approximately 4 up to 80. The factor in the case of comparable structure, E-1/NE-5 and E-2/NE-6, is 20 and 13, respectively. There is therefore a clear advantage relative to the prior art.

Compostions

The inventive and also the noninventive organosiloxanes containing phenyl groups were added at 2 percent by weight to the organosiloxane mixtures M-1 and M-2. The mixtures and the results of performance testing are reported in Tables 5 and 6.

The inventive organosiloxane E-1 and the noninventive organosiloxane NE-5 of comparable structure were added in various concentrations to the organosiloxane mixtures M-1 and M-2. The mixtures and the results of performance testing are reported in Table 7.

Performance Verification of the Release Characteristics

Radiation-curing coating materials were produced by combining 100 g each of the compositions according to Table 5, Table 6 and Table 7. The coating materials were stirred manually with a spatula until there was no longer any visible inhomogeneity. The coating materials were applied to a sheetlike carrier. In all examples said carrier was a BOPP (biaxially oriented polypropylene) film of 50 cm in width that had previously been subjected to corona pretreatment with a generator output of 1 kW. The coating materials were applied using a 5-roll coating unit from COATEMA® Coating Machinery GmbH, Dormagen, Germany with a weight per unit area of about 1 g/m$^2$ and were cured by the action of UV light from a medium-pressure mercury vapour lamp from IST® Metz GmbH, Nürtingen, Germany at 60 W/cm and at a belt speed of 100 m/min under a nitrogen atmosphere with a residual oxygen content of less than 50 ppm. The coated samples were subjected to a test for the release force.

The release effect with respect to adhesive materials, in industrial application usually adhesive tapes or labels, is expressed by the release force, with a low release force describing a good release effect. The release force is dependent on the quality of the release coating, on the adhesive and on the test conditions. For evaluation of release coatings, therefore, identical adhesives and test conditions ought to be present. For the determination of the release forces, adhesive tapes or label laminates are cut to a width of 2.5 cm and the adhesive side is applied to the silicone coating under test. This test is carried out in accordance with FINAT Handbook, 8th Edition, The Hague/NL, 2009 under designation FTM 10, with the modification that the storage is carried out at 40° C. under pressure. The adhesive tape employed was Tesa® 7475, a trade mark of Tesa SE, Hamburg, Germany. The values reported are average values from a five-fold determination and are stated in units [cN/2.5 cm]. The results of the performance verification of the release characteristics are summarized in Tables 5, 6 and 7.

TABLE 5

Non-inventive test mixtures (amounts in percent by weight) and release force according to performance testing.

| Designation | Organosiloxane containing phenyl groups (content) | Radically polymerizable organosiloxane (content) | Release force, Tesa ® 7475 in cN/2.5 cm |
|---|---|---|---|
| M-1 | none | 100 | 7.8 |
| M-2 | none | 100 | 9.6 |
| MNE-1-1-2 | NE-1: 2 | M-1: 98 | 8.9 |
| MNE-1-2-2 | NE-1: 2 | M-2: 98 | 10.3 |
| MNE-2-1-2 | NE-2: 2 | M-1: 98 | 6.9 |
| MNE-2-2-2 | NE-2: 2 | M-2: 98 | 8.9 |
| MNE-3-1-2 | NE-3: 2 | M-1: 98 | 7.5 |
| MNE-3-2-2 | NE-3: 2 | M-2: 98 | 9.2 |
| MNE-4-1-2 | NE-4: 2 | M-1: 98 | 7.1 |
| MNE-4-2-2 | NE-4: 2 | M-2: 98 | 9.0 |
| MNE-5-1-2 | NE-5: 2 | M-1: 98 | 7.7 |
| MNE-5-2-2 | NE-5: 2 | M-2: 98 | 9.5 |
| MNE-6-1-2 | NE-6: 2 | M-1: 98 | 7.6 |
| MNE-6-2-2 | NE-6: 2 | M-2: 98 | 9.5 |

TABLE 6

Inventive test mixtures (amounts in percent by weight) and release force according to performance testing.

| Designation | Organosiloxane containing phenyl groups (content) | Radically polymerizable organosiloxane (content) | Release force, Tesa ® 7475 in cN/2.5 cm |
|---|---|---|---|
| M-1 | none | 100 | 7.8 |
| M-2 | none | 100 | 9.6 |
| ME-1-1-2 | E-1: 2 | M-1: 98 | 3.5 |
| ME-1-2-2 | E-1: 2 | M-2: 98 | 4.8 |
| ME-2-1-2 | E-2: 2 | M-1: 98 | 5.1 |
| ME-2-2-2 | E-2: 2 | M-2: 98 | 7.0 |
| ME-3-1-2 | E-3: 2 | M-1: 98 | 3.5 |
| ME-3-2-2 | E-3: 2 | M-2: 98 | 4.7 |
| ME-4-1-2 | E-4: 2 | M-1: 98 | 5.8 |
| ME-4-2-2 | E-4: 2 | M-2: 98 | 7.2 |
| ME-5-1-2 | E-5: 2 | M-1: 98 | 5.5 |
| ME-5-2-2 | E-5: 2 | M-2: 98 | 7.1 |
| ME-6-1-2 | E-6: 2 | M-1: 98 | 6.0 |
| ME-6-2-2 | E-6: 2 | M-2: 98 | 7.9 |

TABLE 7

Test mixtures (amounts in percent by weight) with different content, and release force according to performance testing.

| Designation | Organosiloxane containing phenyl groups (content) | Radically polymerizable organosiloxane (content) | Release force, Tesa ® 7475 in cN/2.5 cm |
|---|---|---|---|
| M-1 | none | 100 | 7.8 |
| ME-1-1-0.5 | E-1: 0.5 | M-1: 99.5 | 6.1 |
| ME-1-1-2 | E-1: 2 | M-1: 98 | 3.5 |
| ME-1-1-5 | E-1: 5 | M-1: 95 | 2.8 |
| MNE-5-1-0.5 | NE-5: 0.5 | M-1: 99.5 | 7.8 |
| MNE-5-1-2 | NE-5: 2 | M-1: 98 | 7.7 |
| MNE-5-1-5 | NE-5: 5 | M-1: 95 | 7.6 |
| ME-2-1-0.5 | E-2: 0.5 | M-1: 99.5 | 6.5 |
| ME-2-1-2 | E-2: 2 | M-1 98 | 5.1 |
| ME-2-1-5 | E-2: 5 | M-1: 95 | 4.1 |
| MNE-6-1-0.5 | NE-6: 0.5 | M-1: 99.5 | 7.8 |
| MNE-6-1-2 | NE-6: 2 | M-1: 98 | 7.6 |
| MNE-6-1-5 | NE-6: 5 | M-1: 95 | 7.9 |
| M-2 | none | 100 | 9.6 |
| ME-1-2-0.5 | E-1: 0.5 | M-2: 99.5 | 7.2 |
| ME-1-2-2 | E-1: 2 | M-2: 98 | 4.8 |
| ME-1-2-5 | E-1: 5 | M-2: 95 | 3.5 |
| MNE-5-2-0.5 | NE-5: 0.5 | M-2: 99.5 | 9.4 |
| MNE-5-2-2 | NE-5: 2 | M-2: 98 | 9.5 |
| MNE-5-1-5 | NE-5: 5 | M-2: 95 | 9.3 |
| ME-2-2-0.5 | E-2: 0.5 | M-2: 99.5 | 8.3 |
| ME-2-2-2 | E-2: 2 | M-2: 98 | 7.0 |
| ME-2-2-5 | E-2: 5 | M-2: 95 | 5.8 |
| MNE-6-2-0.5 | NE-6: 0.5 | M-2: 99.5 | 9.3 |
| MNE-6-2-2 | NE-6: 2 | M-2: 98 | 9.5 |
| MNE-6-2-5 | NE-6: 5 | M-2: 95 | 9.5 |

From Table 5 it is evident that in coatings with non-inventive compositions, the release force of the base mixtures M-1 and M-2 was not significantly lowered. The coatings with inventive compositions in Table 6, In contrast, consistently showed significantly improved release characteristics. Table 7 shows that in the case of low and relatively high concentration of the added inventive silicones as well, a significantly better release characteristic was always observed. This was not the case with the non-inventive silicones.

The invention claimed is:

1. A composition, comprising components (I) and (II), wherein component (I) is at least one organosiloxane (I) which has at least one aromatic radical $R^{(aryl)}$ which is bonded via a non-aromatic organic radical Z to a silicon atom, and wherein component (II) is at least one organosiloxane (II) which is different from the organosiloxane (I) and which has at least one ethylenically unsaturated, radically polymerizable group selected from the group consisting of methacrylic ester groups and acrylic ester groups.

2. The composition according to claim 1, wherein

Z in each case independently of any other is selected from the group consisting of divalent aliphatic hydrocarbon radicals having 2 to 20 carbon atoms;

$R^{(aryl)}$ in each case independently of any other is selected from the group consisting of radicals according to the general formula

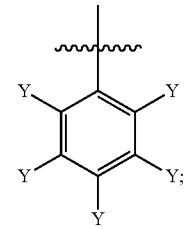

wherein
Y in each case independently of any other is selected from the group consisting of H and monovalent aliphatic hydrocarbon radicals having 1 to 20 carbon atoms.

3. The composition according to claim 1, wherein the organosiloxane (I) has at least one phenyl radical which is bonded via a radical —CH$_2$—CH$_2$— to a silicon atom.

4. The composition according to claim 1, wherein the radicals R$^{(aryl)}$ are bonded via the radicals Z to at least 2% of silicon atoms of the organosiloxane (I).

5. The composition according to claim 1, wherein the radicals R$^{(aryl)}$ are bonded via the radicals Z to terminal silicon atoms of the organosiloxane (I).

6. The composition according to claim 1, wherein the organosiloxane (I) has 10 to 500 silicon atoms.

7. The composition according to claim 1, wherein the organosiloxane (II) has 50 to 500 silicon atoms.

8. The composition according to claim 1, wherein 0.4 to 10% of silicon atoms of the organosiloxane (II) carry ethylenically unsaturated, radically polymerizable groups, where one silicon atom may carry one, two or three such groups.

9. The composition according to claim 1, further comprising a component selected from the group consisting of purely organic, phosphorus-containing or phosphorus-free compounds having at least one ethylenically unsaturated, radically polymerizable group; an organosiloxane (III) which is different from organosiloxane (I) and organosiloxane (II) and which has at least one ethylenically unsaturated, radically polymerizable group; photoinitiators; photosensitizers; fillers; pigments; solvents; curing accelerators; anti-misting additives; amine synergists and stabilizers; antioxidants; and oxygen scavengers.

10. A radiation-curing coating material, comprising the composition according to claim 1.

11. A release coating, which is cured from the radiation-curing coating material according to claim 10.

12. A method for producing a release coating, the method successively comprising directly or indirectly:
 a. applying the composition according to claim 1 to at least one surface; and
 b. irradiating the composition with UV radiation.

13. A release coating, obtainable by the method according to claim 12.

14. A release coating, obtainable by curing of the composition according to claim 1.

* * * * *